Patented Jan. 7, 1947

2,413,860

UNITED STATES PATENT OFFICE 2,413,860

THERMOSETTING RESINS CONTAINING GLYCERYL MONOETHERS AS FLOW PROMOTERS

Alfred Brookes, London, England, assignor, by mesne assignments, to American Cyanamid Company, New York, N. Y.

No Drawing. Application August 24, 1943, Serial No. 499,848. In Great Britain May 5, 1942

10 Claims. (Cl. 260—33)

This invention relates to improving the plasticity of thermo-setting resins of the aminoplastic type such for example as are obtained by the condensation of formaldehyde with urea, thio-urea or cyanamide polymers (e. g. melamine), and mixed resins of these kinds.

These resins when fully polymerised or cured are commonly very hard and brittle and have good resistance to water and weathering conditions. For many purposes the brittleness and lack of elasticity is a disadvantage and it is desirable to overcome these defects without impairing the resistance to water.

Many compounds have previously been suggested as plasticisers for these thermo-setting resins. For lacquer resins, commonly prepared by condensation of the aminoplastic resin in organic solvents, substances such as castor oil, oleic acid, natural resins such as copal, high-boiling esters such as dibutylphthalate and tricresyl phosphate, and glyceryl esters of poly-basic acids (alkyd resins) have frequently been proposed as plasticisers. For the manufacture of moulding compositions and synthetic resin glues where the condensation is normally carried out in aqueous solution the use of dihydric and polyhydric alcohols such for example as ethylene glycol, glycerine, sorbitol and other substances freely soluble in water has been proposed. The disadvantages of these materials are that the former class, whilst having a useful compatibility with the lacquer resins, is unsuitable for use with the aqueous resins, being insoluble in the aqueous system and practically incompatible with the resin after drying. On the other hand the water-soluble substances are miscible in all proportions with both types of resin but their solubility in lacquer solvents is generally of a low order and in all cases the final products are rendered very susceptible to attack by water.

According to the present invention the plasticity of amino-plastic resins is improved, without the aforementioned disadvantages, by adding to the resins prior to the final hardening process, or by condensing the resin-forming components in the presence of one or more of the monoethers of polyhydric alcohols such, for example, as glycerol, and containing the group CH$_2$OR where R represents an aryl, alkaryl or alkyl radicle containing not less than four carbon atoms.

These plasticisers are compatible alike with resins derived from aqueous condensations and with modified resins prepared under substantially non-aqueous conditions by condensation in alcoholic solvents. Examples of suitable plasticisers are the mono n-butyl ether of glycerol, the monophenyl and mono-cresyl ethers of glycerol and the mono-benzyl ether of glycerol.

The plasticised resins may be used as the basis for moulding powders, if desired with the incorporation of ingredients such as, for example, fillers and pigments and for the manufacture of laminated sheets, adhesives, and surface coatings, and for textile treatment. They may also be cast into moulds and hardened by the addition of hardening agents or by heating or both.

The addition of the plasticisers may be made at any convenient stage in the process, prior to final hardening, for example, during the initial condensation of the resin-forming components, or by mixing with the concentrated resin solutions or by grinding with the dried resin prior to moulding.

In the manufacture of moulding powders or adhesives containing fillers, the plasticisers may be blended with the aqueous resin-syrups prior to addition of the filler, or the fillers may be impregnated with the plasticiser and then blended with the resin.

Widely varying proportions of the plasticisers may be employed dependent upon the degree of plasticity required, on the type of resin, the particular plasticiser used and the application to which the resin will be put.

The addition of the plasticised to a standard moulding powder serves to improve the flow characteristics so that much lower moulding pressures may be used. Alternatively a moulding powder which has been dried much further than usual can be plasticised to have normal flow and will then give mouldings having a reduced "after shrinkage" at elevated temperatures owing to the elimination of volatile matter from the resin.

The use of the plasticisers in amino-plastic adhesives confers a great advantage in that the improved plasticity of the hardened glue prevents "crazing" of thick glue layers thus making the adhesives suitable for use in joinery and general wood working. In coating compositions the plasticisers improve the flexibility and adhesion of the amino-resins. When applied to textile materials the plasticised resins give a softer "handle" to the fabric than is obtained with the unplasticized resins.

The following examples illustrate the invention, all parts being by weight:

1. A standard urea resin moulding powder of commerce is milled with 10% by weight of technical monocresyl glyceryl ether. The resultant composition has greatly improved plasticity and flowing properties in the moulding operation and the physical properties of the moulded products are not impaired.

2. A viscous urea-resin syrup suitable for casting into moulds is prepared by known methods. For instance, a solution of 60 parts urea in 162 parts neutral formalin containing 60 parts $CH_2O$ is boiled under reflux condenser and then acidified with .06 part formic acid. Boiling is continued until a test sample of the solution remains clear on cooling but precipitates insoluble resin when diluted with water, whereupon the charge is neutralised and evaporated in vacuo to yield 125 parts of a viscous pourable resin.

50 parts monophenyl glyceryl ether of a high degree of purity are blended with 100 parts of this resin and after addition of 1 part ammonium citrate, which for convenience may be dissolved in about 4 parts water, the mass is cast into moulds and left for 1-2 days to set in the cold. The castings are then stoved at temperatures increasing gradually to 90° C. until fully hardened. Clear transparent products are obtained which have good resistance to moisture and show very marked improvement over similar products prepared from the unplasticized resin in their resistance to cracking through ageing processes.

3. 100 parts technical monocresyl glyceryl ether are blended with 100 parts of a concentrated urea-resin syrup prepared as in Example 2. Immediately prior to use the mass is acidified with 4 parts of a 20% solution of phosphoric acid in alcohol. The mixture, which sets and hardens slowly in the cold but more rapidly under heat, adheres well to plastic mouldings, metals and glass and may be used as a cement, or as a coating composition for production of flexible moisture-resistant films on wood or metal.

4. 42 parts finely ground melamine are heated rapidly with 81 parts neutral formalin of 37% strength to 90° C. and as soon as dissolution is complete 80 parts monocresyl glyceryl ether are added and the materials condensed by boiling for 5-10 minutes. The resultant clear syrup is poured into moulds and concentrated and finally hardened in a continuous heating operation.

5. To 50 parts of a solution of a butylated melamine-formaldehyde resin containing 60% of solid resin are added 60 parts of technical monocresyl ether of glycerol and 30 parts of thinner consisting of a mixture of butyl alcohol and xylol in proportions 1:4. The resulting lacquer may be applied to metal by dipping or spraying and hardened by stoving at 100° C. The stoved film is flexible, hard and adheres well to the metal.

I claim:

1. A thermoset resin obtained by heat-curing a composition comprising a mixture of a condensation product of formaldehyde with an amino compound selected from the group consisting of urea, thiourea, and melamine, and, as a flow promoter, the glyceryl monoether of a monohydroxy aromatic compound containing a benzene ring, said aromatic compound having no more than seven carbon atoms.

2. A thermoset resin obtained by heat-curing a composition comprising a mixture of a condensation product of formaldehyde with an amino compound selected from the group consisting of urea, thiourea, and melamine, and, as a flow promoter, monophenyl glyceryl ether.

3. A thermoset resin obtained by heat-curing a composition comprising a mixture of a condensation product of formaldehyde with an amino compound selected from the group consisting of urea, thiourea, and melamine, and, as a flow promoter, monocresyl glyceryl ether.

4. A thermoset resin obtained by heat-curing a composition comprising a mixture of a condensation product of formaldehyde with an amino compound selected from the group consisting of urea, thiourea, and melamine, and, as a flow promoter, monobenzyl glyceryl ether.

5. A thermo-setting resinous composition comprising a mixture of a condensation product of formaldehyde with an amino compound selected from the group consisting of urea, thiourea, and melamine, and, as a flow promoter, the glyceryl monoether of a monohydroxy aromatic compound containing a benzene ring, said aromatic compound having no more than seven carbon atoms.

6. A thermo-setting resinous composition comprising a mixture of a condensation product of formaldehyde with an amino compound selected from the group consisting of urea, thiourea, and melamine, and, as a flow promoter, monophenyl glyceryl ether.

7. A thermo-setting resinous composition comprising a mixture of a condensation product of formaldehyde with an amino compound selected from the group consisting of urea, thiourea, and melamine, and, as a flow promoter, monocresyl glyceryl ether.

8. A thermo-setting resinous composition comprising a mixture of a condensation product of formaldehyde with an amino compound selected from the group consisting of urea, thiourea, and melamine, and, as a flow promoter, monobenzyl glyceryl ether.

9. A molding composition comprising a filler and a mixture of a condensation product of formaldehyde with an amino compound selected from the group consisting of urea, thiourea, and melamine, and, as a flow promoter, the glyceryl monoether of a monohydroxy aromatic compound containing a benzene ring, said aromatic compound having no more than seven carbon atoms.

10. A molded article prepared by molding the composition of claim 9.

ALFRED BROOKES.